United States Patent [19]

La Grone

[11] 4,281,509
[45] Aug. 4, 1981

[54] FUEL CONTROL SYSTEM

[75] Inventor: Charles H. La Grone, Phoenix, Ariz.

[73] Assignee: The Garrett Corporation, Los Angeles, Calif.

[21] Appl. No.: 8,026

[22] Filed: Jan. 31, 1979

Related U.S. Application Data

[62] Division of Ser. No. 743,387, Nov. 19, 1976, abandoned.

[51] Int. Cl.³ .............................. F02C 7/26; F02C 9/32
[52] U.S. Cl. ............................... 60/39.02; 60/39.14 R; 60/39.28 R
[58] Field of Search ............ 60/39.02, 39.14 R, 39.28

[56] References Cited

U.S. PATENT DOCUMENTS

| 3,075,350 | 1/1963 | McCombs et al. | 60/39.28 |
| 4,010,605 | 3/1977 | Uram | 60/39.14 R |

OTHER PUBLICATIONS

Casamassa et al. *Jet Aircraft Power Systems* N.Y., McGraw Hill Inc., 1957, pp. 92 & 94.

*Primary Examiner*—Louis J. Casaregola
*Attorney, Agent, or Firm*—James W. McFarland; Albert J. Miller

[57] ABSTRACT

A gas turbine fuel control system for controlling the acceleration of an engine during start-up which permits the engine to accelerate substantially along its required-to-run line. Fuel flow to the engine is controlled by a speed governor, and means are included to gradually increase the speed set point of the governor in relation to elapsed time of the start-up period.

13 Claims, 3 Drawing Figures

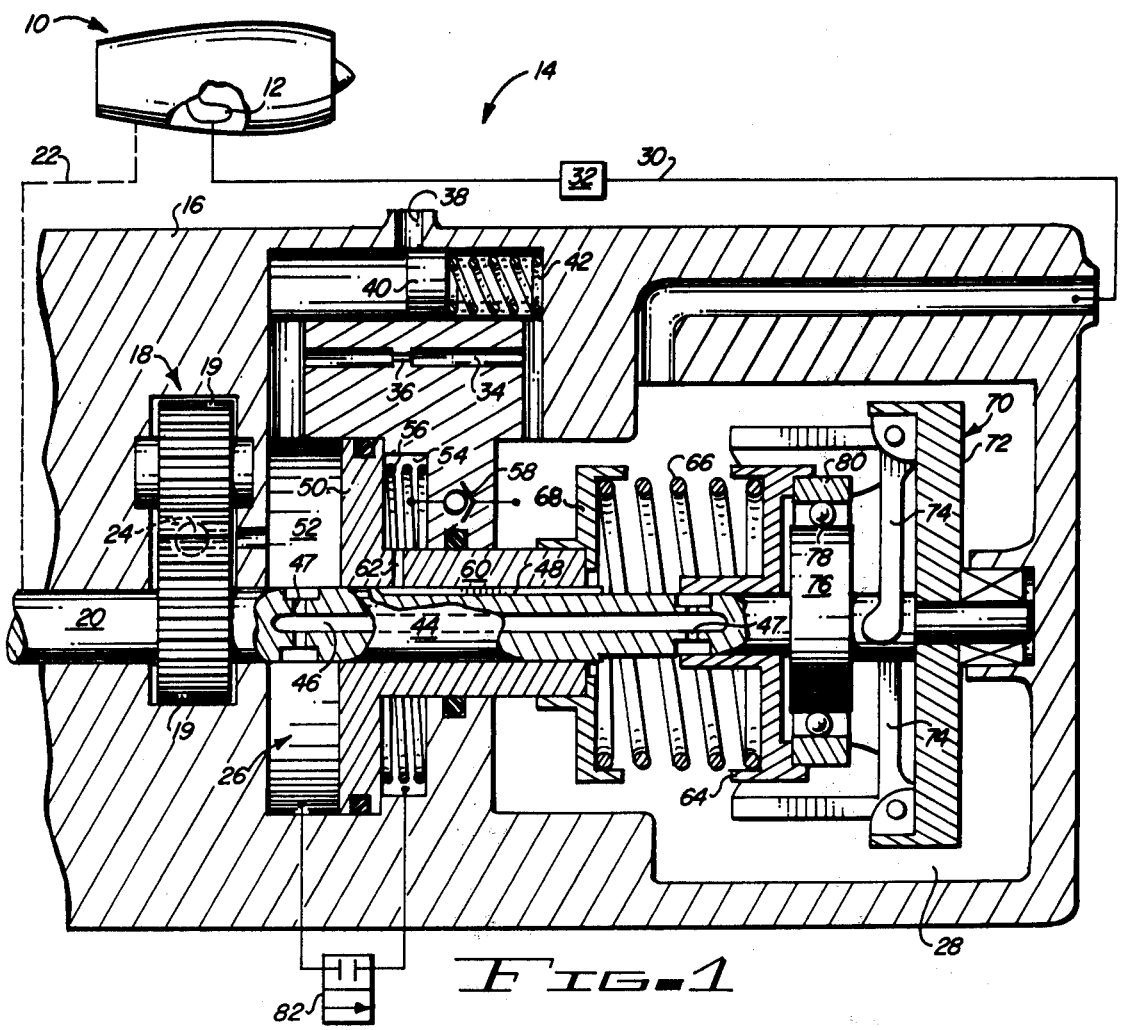
Fig-1
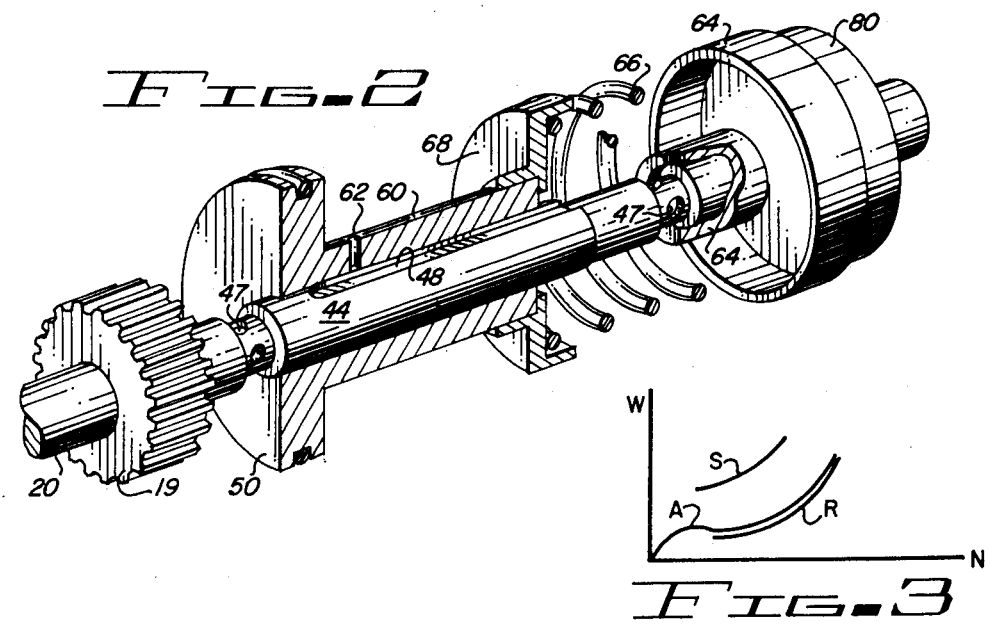
Fig-2
Fig-3

FUEL CONTROL SYSTEM

This is a division of application Ser. No. 743,387 filed Nov. 19, 1976.

BACKGROUND OF THE INVENTION

This invention relates to fuel control systems for delivering fuel flow to gas turbine engines, and relates more particularly to an improved method and apparatus for controlling change in speed of the engine.

Performance of a gas turbine engine, including its acceleration characteristics, are limited by the onset of compressor instability or stall. Accordingly, fuel control systems for a gas turbine engine are devised to, in one way or another, control fuel flow to avoid the region of compressor instability. For fastest engine acceleration during starting, on the other hand, it has generally been proposed to control fuel flow to the engine such that engine performance closely approaches but does not encounter the region of instability or stall. In this manner, it has been theorized that power is developed most rapidly by the engine and maximum acceleration thus results. To accomplish this result, the majority of prior art fuel control systems are primarily concerned with sensing the proper engine performance parameters which indicate the engine is operating at its near maximum performance before encountering stall, and accordingly scheduling fuel flow in response to these sensed parameters. Thus, sensing temperature and pressure at various locations in the gas flow path through the engine, then scheduling fuel flow in relation to these various sensed temperatures, pressures and other factors, has been a conventional approach to scheduling fuel flow to the engine during its acceleration. By attempting to accelerate the engine closely to its region of instability, such prior art fuel control systems also were well suited to avoid engine operation near its required-to-run line during acceleration to minimize the possibility of "hung" starts. Conversely to the instability or stall characteristics of a particular engine, the required-to-run line of the engine dictates the minimum amount of fuel flow required to the engine in order to overcome the inertia thereof, load imposed thereon, and the like in order to maintain a given speed. Fuel flow less than that dictated by the required-to-run line causes deceleration of the engine to a slower speed, and to accelerate the engine, obviously, the fuel flow to the engine must be above the required-to-run line.

A serious drawback for fuel control systems operating to accelerate a gas turbine engine relates to the inability to obtain sufficiently accurate measurements of the various parameters of pressure, temperature, etc. utilized in controlling fuel flow. Such sensing devices have proved to be somewhat unreliable due to slow response time and ultimate deterioration from the extreme environmental conditions to which they may be exposed. Beyond this, it is also recognized that the sensing of such various engine parameters only gives a general "estimate" of how close the engine may be running to its instability region for a given set of external conditions. Onset of compressor instability or engine stall varies greatly dependent upon external ambient conditions such as temperature and pressure of the ambient airflow being received by the engine, as well as even the temperature of the fuel flow being delivered to the engine. Such change in environmental conditions which markedly affect engine performance characteristics are highly pronounced in aircraft applications of gas turbine engines where the ambient conditions can vary drastically. Accordingly, fuel control systems have become more and more sophisticated to compensate for various changes in external conditions such that conditions of instability are avoided, yet while assuring the engine can still be maintained above its required-to-run line. For instance, the fuel control system must take into account sufficient variations in engine performance characteristics so as to avoid "hot starts" which are more likely to occur at high altitude restarts of an aircraft mounted engine. "Hot starts" are a result of the engine running near its stall line by delivering a high volume fuel flow to the engine combustion chamber such that a relatively high temperature at the discharge of the engine turbine and downstream of the combustion chamber, as well as high temperature exhaust from the engine results. Excessive temperature on the turbine and exhaust components created by such "hot starts" can cause engine failure due to overheating of these downstream components. Exemplary disclosures of prior art systems may be found in U.S. Pat. Nos. 3,011,310; 3,043,367; 3,085,619; 3,139,892; 3,399,527.

SUMMARY OF THE INVENTION

It is a primary object of the present invention to provide an improved fuel control system and method wherein the engine accelerates substantially along or as closely adjacent its required-to-run line regardless of ambient external conditions.

Another important object of the present invention is to provide a fuel control system which accelerates a gas turbine engine without reliance upon sensing of various engine temperature and pressure parameters for its operation.

Another important object of the invention is to provide a novel fuel control and method for a gas turbine engine which accelerates the engine as a function of the elapsed time of the engine start-up period.

Another important object of the invention is to provide fuel controls and methods which control engine speed throughout acceleration to a preselected speed set point, along with method and means for changing the pre-selected set point speed to produce a desired acceleration.

More particularly, the invention contemplates a fuel control system having a speed governor responsive to engine speed to variably meter fuel flow delivered to the engine in a feedback loop arrangement in order to maintain engine speed at the set point of the governor. In conjunction with this, the invention contemplates method and means for adjusting the set point of the governor along a pre-selected schedule to produce the desired change of speed of the engine at a controlled rate. Specifically, to accelerate the engine along its required-to-run line, the speed set point of the governor is changed gradually at a rate which is somewhat slower than the corresponding acceleration of the engine when accelerating along its required-to-run line. In a preferred embodiment, such schedule change in the governor speed set point is accomplished by a timing mechanism which is responsive to the elapsed time of the engine start-up period.

These and other more particular objects and advantages of the present invention are specifically set forth or will become apparent from the following detailed description of a preferred embodiment of the invention, when read in conjunction with the accompanying drawing.

BRIEF DESCRIPTION OF THE DRAWING

FIG. 1 is a partially schematic, partially cross sectional view of a gas turbine engine and fuel delivery system constructed in accordance with the principles of the present invention;

FIG. 2 is an exploded perspective view of the timing mechanism contemplated by the present invention; and FIG. 3 is a graphical representation of the fuel flow rate, W, delivered to the engine versus engine speed, N.

DETAILED DESCRIPTION OF THE PREFERRED EMBODIMENT

Referring now more particularly to the drawing, a gas turbine engine 10 incorporates a combustion chamber 12 and a fuel delivery system 14 for controlling fuel flow to the combustion chamber. The fuel control system 14 includes a housing 16 having a fuel pump 18 of the type including a pair of intermeshing gears 19 which are driven by a shaft 20 operably coupled to the rotating drive shaft of the engine by an appropriate drive train schematically illustrated by dashed lines 22. Pressurized fuel flow from pump 18 is delivered through its outlet port 24 to a first fuel chamber 26 in housing 16. A second fuel chamber 28 in the housing communicates with the combustion chamber 12 through an appropriate conduit 30. The present fuel control 14 can be used in conjunction with various other conventional fuel control devices as schematically illustrated by element 32. Chambers 26 and 28 communicate through a by-pass passage 34 having a minimum fuel control element therein, illustrated as a fixed orifice 36, which dictates the minimum rate of fuel flow delivered from chamber 26 to chamber 28 throughout operation of the engine. Housing 16 further include an exhaust duct 38 preferably interconnected with the inlet (not shown) of the pump 18. A metering valve 40 movably mounted within housing 16 and urged leftwardly by a biasing spring 42 acts to variably meter exhaust fuel flow from chamber 26 through exhaust duct 38. The opposite sides of the piston represented by valve 40 are respectively exposed to the pressure of fuel maintained in chambers 26 and 28. In conventional manner therefore, the valve 40 acts to maintain a substantially constant pressure differential between chambers 26 and 28 by variably metering exhaust flow from chamber 26 through duct 38.

The fuel control system further includes timing mechanism in the form of a timing shaft 44 rigidly secured to rotate with fuel pump 18 and thus be rotatably driven by the engine 10. Shaft 44 extends between first and second chambers 26 and 28 and includes a first internal flow passageway 46 having opposite ends communicating with the chambers 26, 28 through cross bores 47. The timing shaft 44 further includes a second passage in a form of a groove 48 on a portion of the external surface of shaft 44, which groove 48 continually communicates with second fuel chamber 28. A non-rotating piston means 50 is disposed in chamber 26 to divide the latter into first and second compartments 52, 54 on opposite sides of piston 50. Compartment 52 directly communicates with the pump outlet 24, while the second compartment 54 presents a substantially trapped fluid volume. A light biasing spring 56 is mounted in compartment 54 to urge piston 50 leftwardly against the force exerted by pump outlet fluid pressure in chamber 52, and a one-way check valve 58 permits one-way fluid communication from second chamber 28 to second compartment 54 while prohibiting reverse fluid flow therebetween. Firmly affixed to piston 50 is a non-rotating sleeve 60 disposed in substantially surrounding relationship to timing shaft 44. A cross duct 62 in sleeve 60 permits periodic communication of the second compartment 54 with the exhaust path defined by groove 48 once each revolution of shaft 44.

Metering means in the form of a non-rotating element having a leftwardly extending valve portion 64 is cooperable with rotating shaft 44 to variably meter fluid flow from passage 46 through cross bore 47 to second chamber 28. Biasing means in the form of a single helical coil spring 66 urges valve 64 rightwardly as viewed in FIGS. 1 and 2 to increase the rate of fuel flow into chamber 28. Spring 66 is grounded to an abutment shoulder 68 secured to sleeve 60 and thus operably carried by piston 50. It will be apparent that the rightwardly directed biasing force exerted by spring 66 varies in relationship to the axial movement of piston 50. A somewhat conventionally structured speed governor generally denoted by the numeral 70 operates to exert a leftward force on valve 64 opposing that created by biasing spring 66. The governor includes a disc 72 secured to rotate with timing shaft 44, and a plurality of flyweights 74 are rotatably mounted at the periphery of disc 72 such that the inwardly extending arms of the flyweights 74 are engagable with an inner rotating race 76 as shaft speed increases and the flyweights 74 tend to rotate outwardly under centrifugal forces. Inner race 76 rotates with shaft 44, and through ball bearings 78 transmits the axial force exerted by the flyweight arms 74 to a non-rotating outer race 80 which engages valve 64. Thus, upon increase in speed of shaft 44 the flyweight arms 74 tend to rotate radially outwardly and exert a corresponding force tending to shift valve 64 leftwardly to restrict fluid flow from passage 46 to chamber 28. If desired, a valve 82 may be incorporated which is shiftable between its closed position illustrated blocking fluid communication between compartments 52 and 54, to a flow permitting position wherein fluid pressure flow from first chamber 52 is directed into second chamber 54.

In operation, the performance characteristics of a conventional gas turbine engine can be most clearly understood by reference to FIG. 3 which provides a plot of the fuel flow rate, "W", versus the engine speed of operation, "N". Characteristically, the gas turbine engine operates below an upper line "S" which indicates the conditions under which stall, surge or compressor instability can be encountered, and thus defines the upper limit of operation of the gas turbine engine. The engine thus must operate under the line "S", and yet above the lower curved line "R" which is indicative of the required-to-run line characteristic of the engine. The required-to-run line simply means the minimum amount of fuel flow required to maintain the engine at a certain engine speed. Each of the engine operating limit lines "S" and "R" can vary substantially dependent upon various changes in different operating parameters, including the changes in external ambient conditions. Upon consideration, it will be appreciated that the required-to-run line "R" is an indication of the overall inertia, load of the engine, etc, which must be overcome in order to maintain a certain engine speed. The required-to-run line specifies the minimum power required, at a given set of ambient conditions and other parameters such as engine load, required to maintain a certain engine speed. It will also be apparent that there exists a corresponding engine acceleration for the engine to accelerate from a lower to a higher speed and yet while operating substantially along or closely adjacent to this required-to-run line "R". Fuel control system 14 of the present invention is operable to assure that the engine does accelerate substantially along or closely adjacent to the required-to-run line "R" regardless of changes in the required-to-run line itself due to various external operating parameters such as external ambient conditions.

Fuel control system 14 operates in the following manner. Upon start-up of engine 10 through an external power source such as an electric motor, pump 18 gradually begins increasing in speed and displacing pressurized fuel flow through its outlet 24 into compartment 52. Piston 50 is located at its far leftward position upon start-up. In this position, fluid flow from compartment 52 into internal passage 46 of the timing shaft is substantially less than that allowed through the bypass orifice 36. Accordingly, the size of bypass orifice 36 is the controlling parameter during the initial start-up phase of the engine. As illustrated by line "A" in FIG. 3, the bypass orifice 36 is appropriately sized to allow engine start fuel flow into second chamber 28 and thus into combustion chamber 12. During this initial phase of start-up and throughout engine operation, the pressure differential valve 40 operates to maintain a substantially constant pressure differential between compartment 52 and chamber 28. In this context it is noted that pump 18 is conventionally sized such that its output displacement is somewhat greater than that required by the fuel delivery system such that a certain amount of return exhaust flow continues through exhaust duct 38 to the inlet of the pump. In this manner the pump is so sized that the rate of fuel flow delivered therefrom is not a factor in the control function itself.

During the start-up period, the speed of the engine 10 is relatively low and governor 70 does not exert sufficient force on valve 64 to control engine operation. Accordingly, the rate of fuel flow as depicted by line "A" dictates that a fuel enriched initial start phase has occurred. Once engine speed picks up to a certain minimum level, the speed governor 70 comes on control by exerting a leftward force on valve 64 strong enough to overcome the force of spring 66 and urge valve 64 to a position metering fuel flow from passage 46 into chamber 28. In combination with the movement of the speed governor flyweights 74, the initial revolutions of shaft 44 have allowed enough exhaust of fuel flow from second compartment 54 to duct 62 and groove 48 into chamber 28 to allow slight rightward movement of piston 50 to clear communication between first compartment 52 and internal passage 46. Accordingly, at a pre-selected engine speed, and at a pre-selected elapsed time of the engine start-up period as determined by pre-selected number of revolutions of timing shaft 44, fuel flow from compartment 52 passes primarily through passage 46 to second chamber 28, and the position of valve 64 becomes the fuel controlling parameter.

By allowing only a single spurt of fuel from compartment 54 through groove 48 once each revolution of timing shaft 44, the rightward movement of piston 50 is quite slow, particularly in comparison to the response time of the feedback speed control presented by governor 72. In this context, the response time of governor 70 in shifting and moving the valve 64 leftwardly and rightwardly is sufficiently faster than the relatively slow movement of piston 50, such that the valve 64 is capable of modulating the rate of fuel flow into chamber 28 so as to bring engine speed to a pre-selected level in accordance with the speed feedback control system provided by governor 70. Thus, once the position of valve 64 becomes the parameter controlling fuel flow, the engine operating line A of FIG. 3 immediately is brought down to the required-to-run line R by governor 70. Being a simple feedback loop control system, it is apparent that governor 70 operates to reduce fuel flow to the engine so as to maintain engine speed at a certain pre-selected value, and thus dictates that the engine run on its required-to-run line R regardless of parameters such as ambient pressure and temperature which affect the required-to-run line.

As the engine continues to operate, however, it will be apparent that piston 50 continues to shift at a slow speed gradually rightwardly as a small spurt of fluid leaves compartment 54 during each revolution of timing shaft 44. The rightward movement of piston 50 also moves abutment 68 rightwardly increasing the compression of biasing spring 66. This increases the speed set point and thus requires the engine to increase its speed to produce a greater force on governor 70 to counteract the increased biasing force of the more compressed spring 66. In this manner it can be seen that as the piston 50 gradually moves rightwardly, the engine gradually accelerates along the required-to-run line. Once piston 50 is shifted completely rightwardly, the governor 70 continues to maintain a constant engine speed thereafter as the biasing spring 66 exerts the precise force required to maintain engine speed at its maximum desired constant speed value.

It will be apparent that the timing piston 50 gradually increases the compression of spring 66 and thus the speed set point of the governor 70 in relation to the elapsed time of the start-up or acceleration period. Preferably, the speed of movement of piston 50 is sufficiently slow to assure that the engine runs along its required-to-run line in order to minimize unnecessary heat buildup in the engine as exemplified by an increasing turbine discharge or engine exhaust temperature. However, if desired, the speed of movement of piston 50 may be otherwise controlled as by the size of duct 62 and/or groove 48 to allow the engine to accelerate at a faster rate, i.e., substantially displaced from the required-to-run line R and closer to the stall line S.

To assure that the engine accelerates substantially along or closely adjacent the required-to-run line R, it is required that the speed of movement of piston 50 be less than the corresponding acceleration of the engine when accelerating along its required-to-run line. For instance, if it is assumed that an engine normally requires 40 seconds to accelerate to 100% speed if operating completely along its required-to-run line, then the duct 62 and groove 48 are sized such that the time required for piston 50 to move from its completely leftward to its completely rightward position be slightly more than 40 seconds; i.e., 45 seconds.

Once the engine is decelerated and/or stopped, second compartment 54 is automatically refilled with fuel through one-way check valve 58 by virtue of the leftward movement of piston 50 created by biasing spring 56 once pressure in compartment 52 is relieved. Thus piston 50 is automatically reset for another engine start. It will be apparent from the foregoing that the selected maximum engine speed may also be varied from that dictated by complete rightward movement of the piston 50, simply by modulating the inflow and outflow of fluid through compartment 54 in order to hold piston 50 at a position other than its far rightward position during constant speed engine operation. For instance, a second engine speed may be selected simply by actuating a valve 82 to interconnect compartments 52 and 54. By relatively sizing these two compartments and spring 56, the force of spring 56 can overcome the equal pressures maintained in compartments 52 and 54 to shift piston 50 completely leftwardly so that fuel flow to the combustion chamber 12 is controlled solely by orifice 36. In response, the engine will be maintained at a constant speed determined by the rate of fuel flow permitted through orifice 36.

In the preferred embodiment fluid exhausts from compartment 54 to chamber 28 and on to the combustion chamber 12. This small fuel flow has a negligible effect on the engine, but in any case can be taken into account in controlling engine acceleration. If desired, flow from compartment 54 could be exhausted elsewhere, such as to exhaust duct 38. It will be also apparent that the present invention may be utilized in conjunction with other conventional engine fuel delivery controls as exemplified by controls 32, and that the fuel control system 14 may be easily adapted to different engines simply by modifying the size, shape, or number of duct 62, groove 48, and volume of compartment 54.

It will be noted that the required-to-run line R approximates a second order curve while the varying force created by a single helical coil compression spring 66 is normally approximating a first order function. To compensate for the second order curve R, a pair of helical coil compression springs 66 may be incorporated. By incorporating such a pair of compression springs, the bypass orifice 36 may be made quite small such that the governor 70 and valve 64 begin controlling engine operation at a relatively low speed; i.e., 10% of rated maximum speed. On the other hand, it has been found preferable in many instances to size orifice 36 and the movement of piston 50, such that the orifice 36 controls engine operation up to approximately 45% of rated speed. This provides a fuel enrichment during initial startup as discussed previously, and also then allows a single spring 66 to be utilized since the required-to-run line from the 40% speed point to 100% speed point can be closely approximated by a linear function such as that by spring 66.

While it would appear that a somewhat slower engine acceleration would result from the present invention, it has been found in actual practice that since the engine operates substantially at its required-to-run line throughout acceleration and at greater engine efficiency, the acceleration time is only slightly longer than if the engine were operating near curve S. Thus, the better engine efficiency at curve R substantially offsets any time decrease afforded by operating near curve S. Tests have also shown a substantial reduction in turbine discharge temperature during acceleration, and the automatic compensation for changes in the parameters that affect the required-to-run line.

From the foregoing, it will be apparent that the present invention contemplates an improved apparatus and method for controlling fuel flow to a gas turbine engine by adjusting fuel flow to the engine during a start-up period in relation to the elapsed time of the start-up period. Further, it will be apparent that the invention contemplates a method of accelerating a gas turbine engine wherein engine speed is sensed, fuel flow to the engine is adjusted in relation to the sensed speed to maintain the engine at a pre-selected speed, and then the pre-selected speed set point is increased at a selected rate. Preferably this selected rate is slower than the corresponding acceleration of the engine when operating its required-to-run line. In other words, the pre-selected speed as dictated by the position of piston 50 and the compression of spring 66, is increased at a rate slower than the corresponding acceleration which occurs as the engine develops power along a minimum power requirement schedule defined as that power required to overcome engine inertia and the like to maintain a certain engine speed. Further the invention contemplates such a method wherein fuel flow to the engine is adjusted to the difference between actual and selected engine speeds to minimize the difference therebetween by the action of the governor 70 and speed feedback control, and the value of the desired engine speed signal is automatically changed at a pre-selected rate, preferably the response rate of the speed feedback control being substantially faster than the pre-selected rate at which the value of the desired speed signal is changed. In the illustrated embodiment these methods and apparatus are carried out by increasing the force created by compression spring 66 in order to cause engine acceleration. The spring force is increased by movement of the piston 50 which is controlled in relation to the cumulative number of revolutions of the timing mechanism represented by timing shaft 44.

The foregoing detailed description of a preferred embodiment of the invention should be considered exemplary in nature and not as limiting to the scope and spirit of the invention as set forth in the appended claims.

Having described the invention with sufficient clarity that those skilled in the art may make and use it, I claim:

1. A method of accelerating a gas turbine engine having a minimum power requirement schedule for overcoming engine inertia and the like to sustain different engine speeds, said engine having a corresponding acceleration upon the developing power along said minimum power schedule, said method comprising the steps of:
   sensing engine speed;
   adjusting fuel flow to the engine in response to the sensed speed to maintain the engine at a preselected speed; and
   increasing said preselected speed at a rate slower than said corresponding acceleration.

2. A method of accelerating a gas turbine engine having a required-to-run line performance characteristic, comprising the steps of:
   sensing engine speed;
   adjusting fuel flow to the engine in response to the sensed speed to maintain the engine at a preselected speed; and
   increasing said preselected speed at a rate sufficiently slow whereby the engine accelerates substantially along its required-to-run line.

3. In a method for controlling fuel flow to a gas turbine engine during a start-up period encompassing acceleration of the engine to approximately its rated speed, wherein the improvement comprises the step of:
   adjusting fuel flow to the engine in relatin to the cumulative number of revolutions of the engine during said start-up period.

4. In a method as set forth in claim 3, further including the step of accelerating the engine from zero to approximately 100% rated engine speed in a predetermined period of time.

5. In a method as set forth in claim 3, further including the step of accelerating the engine substantially along its required-to-run-line between at least approximately 45% and 100% rated engine speed.

6. A method of controlling fuel flow to a gas turbine engine, comprising the steps of:
   moving a metering member to adjustably meter fuel flow to the engine;
   generating signals indicative of actual and desired engine speeds;
   exerting a first force on said metering member in relation to the signal indicative of actual engine speed;
   exerting a second force on said metering member in opposition to said first force and in relation to the signal indicative of desired engine speed; and
   automatically adjusting the value of said signal indicative of desired engine speed in relation to the cumulative number of revolutions of the engine during start-up of the engine.

7. In a method as set forth in claim 6, further including the step of accelerating the engine from zero to approximately 100% rated engine speed in a predetermined period of time.

8. In a method as set forth in claim 6, further including the step of accelerating said engine substantially along its required-to-run-line between at least approximately 45% and 100% rated engine speed.

9. A method as set forth in claim 6 wherein said gas turbine engine has a minimum power requirement schedule for overcoming engine inertia and the like to sustain different engine speeds, said engine having a corresponding acceleration upon the developing power along said minimum power schedule, said adjusting step including increasing the value of said signal indicative of desired engine speed at a rate slower than said corresponding acceleration.

10. A method as set forth in claim 6 wherein said adjusting step includes increasing the value of said signal indicative of desired engine speed at a rate sufficiently slow whereby the engine accelerates substantially along its characteristic required-to-run-line.

11. In a method as set forth in claim 3, wherein said gas turbine engine has a minimum power requirement schedule for overcoming engine inertia and the like to sustain different engine speeds, said engine having a corresponding acceleration upon the developing power along said minimum power schedule, and further including the steps of:
   sensing engine speed;
   adjusting fuel flow to the engine in response to the sensed speed to maintain the engine at a preselected speed; and
   increasing said preselected speed at a rate slower than said corresponding acceleration.

12. In a method as set forth in claim 11, wherein said increasing step includes increasing said preselected speed in relation to the elapsed time of said start-up period.

13. In a method as set forth in claim 3, wherein said adjusting step includes adjusting fuel flow in relation to the elasped time of said start-up period.

* * * * *